United States Patent
Porter, III et al.

(10) Patent No.: US 7,148,824 B1
(45) Date of Patent: Dec. 12, 2006

(54) AUTOMATIC DETECTION OF CHARACTER ENCODING FORMAT USING STATISTICAL ANALYSIS OF THE TEXT STRINGS

(75) Inventors: Gilbert B. Porter, III, Rochester, NY (US); Mirelsa Fontanes-Pérez, Webster, NY (US); William Soon Hock Tay, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/198,428

(22) Filed: Aug. 5, 2005

(51) Int. Cl.
*H03M 7/00* (2006.01)

(52) U.S. Cl. .............. 341/90; 341/51; 341/55

(58) Field of Classification Search ........... 341/50–52, 341/55; 358/1.15; 370/252; 382/181, 229; 704/8, 9; 707/5, 100; 709/245, 229; 712/300; 715/536; 708/203; 717/106; 714/807
See application file for complete search history.

(56) References Cited

U.S. PATENT DOCUMENTS

| | | | | |
|---|---|---|---|---|
| 4,843,389 A | * | 6/1989 | Lisle et al. | 341/106 |
| 5,282,194 A | * | 1/1994 | Harley et al. | 370/252 |
| 5,414,650 A | * | 5/1995 | Hekhuis | 708/203 |
| 5,649,214 A | * | 7/1997 | Bruso et al. | 704/8 |
| 5,778,361 A | * | 7/1998 | Nanjo et al. | 707/5 |
| 5,889,481 A | * | 3/1999 | Okada | 341/51 |
| 5,949,355 A | * | 9/1999 | Panaoussis | 341/51 |
| 6,035,268 A | * | 3/2000 | Carus et al. | 704/9 |
| 6,049,869 A | * | 4/2000 | Pickhardt et al. | 712/300 |
| 6,246,976 B1 | * | 6/2001 | Mukaigawa et al. | 704/9 |
| 6,314,469 B1 | * | 11/2001 | Tan et al. | 709/245 |
| 6,400,287 B1 | * | 6/2002 | Ehrman | 341/55 |
| 6,525,831 B1 | * | 2/2003 | Evans, IV | 358/1.15 |
| 6,542,933 B1 | * | 4/2003 | Durst et al. | 709/229 |
| 6,650,261 B1 | * | 11/2003 | Nelson et al. | 341/106 |
| 6,668,085 B1 | * | 12/2003 | Evans | 382/229 |
| 6,701,320 B1 | * | 3/2004 | Marple | 707/100 |
| 6,829,386 B1 | * | 12/2004 | Sung | 382/181 |
| 7,058,726 B1 | * | 6/2006 | Osaku et al. | 709/245 |
| 2003/0106040 A1 | * | 6/2003 | Rubin et al. | 717/106 |

* cited by examiner

*Primary Examiner*—Linh Nguyen
(74) *Attorney, Agent, or Firm*—Alix, Yale & Ristas, LLP

(57) ABSTRACT

A method of detecting the encoding utilized in an electronic document includes testing the text strings to determine whether the electronic document contains only text strings having legal numeric codes. A statistical analysis of the text strings is then conducted to provide a mapping of legally coded candidates. The legally coded candidates are ranked and combined with an expected ranking of legally coded candidates to provide a most probable character mapping.

17 Claims, 2 Drawing Sheets

AUTOMATIC DETECTION OF CHARACTER ENCODING FORMAT USING STATISTICAL ANALYSIS OF THE TEXT STRINGS

BACKGROUND

This disclosure relates generally to character encoding systems and methods. More particularly, the present disclosure relates to systems and methods of detecting character encoding in electronic documents.

In electronic documents, text is most often represented as a sequence of computer bytes or words of various bit lengths. The mapping that has evolved from text characters to the numeric codes is many to one. Furthermore, the representation of the numeric codes (encoding) is not unique. Mechanisms such as code pages allow the proper decoding of the numeric codes into the correct, corresponding text characters. To do this properly, both the character to numeric code mapping and the numeric code encoding scheme must be known.

The use of computer networks, particularly the Internet, to store data and provide information to users has become increasingly common. Client computers, such as home computers, can connect to other clients and servers on the Internet through a regional Internet Service Provider ("ISP") that further connects to larger regional ISPs or directly to one of the Internet's "backbones." Regional and national backbones are interconnected through long range data transport connections such as satellite relays and undersea cables. Through these layers of interconnectivity, each computer connected to the Internet can connect to every other (or at least a large percentage) of other computers on the Internet.

The Internet is generally arranged on a client-server architecture. In this network model, client computers request information stored on servers and servers find and return the requested information to the client computer. The server computers can store a variety of data types and provide a number of services. For example, servers can provide telnet, FTP (file transfer protocol), gopher, SMTP (simple mail transfer protocol) and World Wide Web services, to name a few. In some cases, any number of these services can be provided by the same physical server over different ports. If a server makes a particular port available, client computers can connect to that port from virtually anywhere on the Internet, leading to global connectivity between computers.

For typical Internet users, the World Wide Web and email (SMTP) have become the predominant services utilized. The World Wide Web was developed to facilitate the sharing of technical documents, but over the past decade the number of information providers has increased dramatically and now technical, commercial and recreational content is available to a user from around the world. The information provided through World Wide Web services is typically presented in the form of hypertext documents, known as web pages, that allow the user to "click" on certain words and graphics to retrieve additional web pages.

When a user requests a web page, a program known as a web browser can make a request to the appropriate web server, the web server locates the web page and transmits the data corresponding to the web page to the client computer as a series of ones and zeros. The web browser must transform the bytes received into recognizable characters for display to the user.

Character encoding schemes provide a mechanism for mapping the retrieved bytes to recognizable characters. In a character encoding scheme, a "coded character set" is a mapping from a set of characters to a set of non-negative integers, with a character being defined within the coded character set if the coded character set contains a mapping from the character to an integer. The integer is known as a "code point" and the character as an "encoded character." A large number of character encoding schemes are defined, many of which are defined by individual vendors, but no standardized character encoding scheme has been adopted universally. The lack of standardization is problematic because an integer that maps to the character "a" in one character encoding scheme may map to "I," a Chinese character, or no character at all in another character encoding scheme. If a web browser receiving web page data uses an incorrect character encoding scheme to display the web page's contents, the contents may appear as unintelligible or meaningless.

In order to properly display a web page, a web browser must determine the appropriate character encoding scheme for that web page. This is typically done by reading a "charset" parameter in the content-type HTTP header of the web page or in a META declaration contained in the web page. Both these mechanisms, however, require that character encoding scheme be defined in the content of the web page itself. For web pages that do not provide this character encoding information, the web browser must attempt to determine the appropriate character encoding scheme through other mechanisms.

Existing web browsers such as Microsoft's® Internet Explorer and Netscape's® Navigator attempt to determine the appropriate character encoding scheme (when the character encoding scheme is not otherwise defined) by defining subsets of character ranges that are unique or special to a given character encoding scheme. For example, the web browser may define 1–3 as corresponding to a first character encoding scheme and 6–9 as corresponding to a second character encoding scheme. If the integers received by the web browser are 4, 5 and 8, more of these integers fit in the defined range 6–9 for the second character encoding scheme. Therefore, the web browser could choose that scheme. The web browser can then display characters based on the second character encoding scheme. This process can be inefficient because the web browser must test a large number of ranges and can be inaccurate as the ranges for various character encoding schemes can overlap. Moreover, many character encoding schemes do not use consecutive integers to encode characters and the character encoding scheme may not use a well-defined range of integers to encode characters, leading to the display of incorrect characters by the web browser.

SUMMARY

There is provided a method of detecting the encoding utilized in an electronic document comprises testing the text strings to determine whether the electronic document contains only text strings having legal numeric codes. A statistical analysis of the text strings is then conducted to provide a mapping of legally coded candidates. The legally coded candidates are ranked and combined with an expected ranking of legally coded candidates to provide a most probable character mapping.

The text strings of at least one of the legal numeric codes may be associated with a specific range of characters. Accordingly, the statistical analysis may include comparing the text strings of the electronic document to the specific range of characters of the at least one legal numeric code.

The text strings of at least one of the legal numeric codes may be associated with a specific encoding at a specific locale of the text string. Accordingly, the statistical analysis may include determining whether the text strings of the electronic document include the specific encoding at the specific locale.

The method may also comprise periodically conducting a statistical analysis of the legal numeric codes to determine a ranking of most commonly used legal numeric codes. This ranking of most commonly used legal numeric codes is then used as the expected ranking of legally coded candidates. One or more of the legal numeric codes may be a preferred code within a specific geographic region. In this event, the expected ranking of legally coded candidates may be weighted to favor the preferred code when the electronic document is encoded in the specific geographic region.

Testing the text strings comprises examining each text string of the electronic document byte by byte, determining whether each text string conforms with the rules of one of the legal numeric codes, and identifying each text string that does not conform with the rules of one of the legal numeric codes. This process is repeated for each one of the legal numeric codes.

At least one of the legal numeric codes may correlate with a language. In this event, ranking the legally coded candidates may include determining whether the frequency of occurrence of the bytes corresponds with usage patterns for characters corresponding with a language and correlating the language to one of the legal numeric codes.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
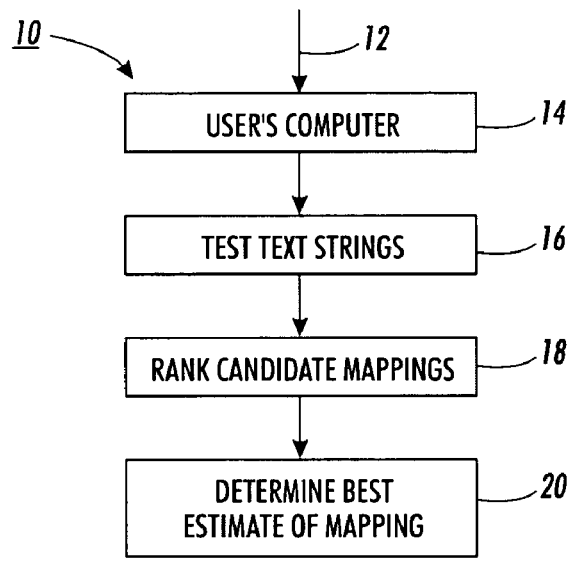
FIG. 1 is a flow diagram of a method of detecting the encoding utilized in an electronic document.
Figure 2:
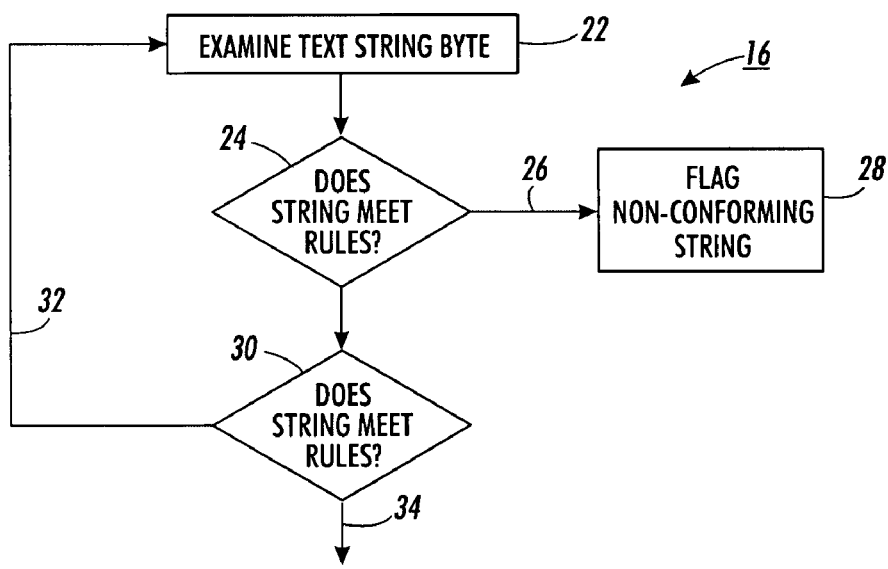
FIG. 2 is a flow diagram of the text string testing routine of the method of detecting the encoding utilized in an electronic document.
Figure 3:
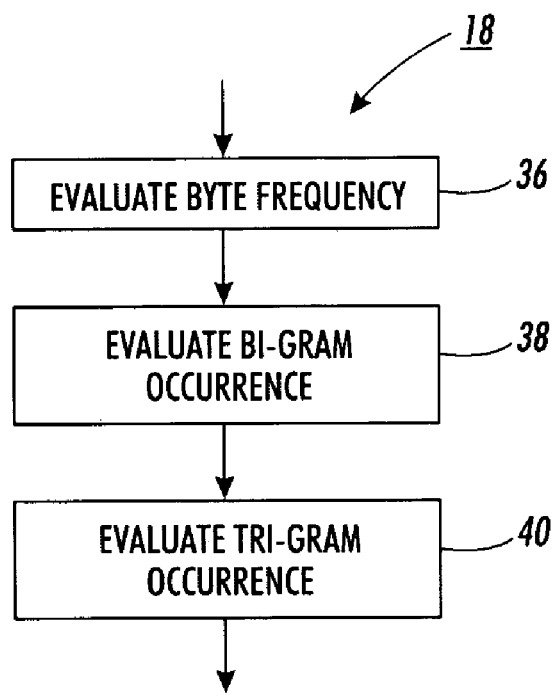
FIG. 3 is a flow diagram of candidate mappings ranking routine of the method of detecting the encoding utilized in an electronic document.

With reference to the drawings wherein like numerals represent like parts throughout the several figures, a method 10 of detecting the encoding utilized in an electronic document by estimating the character mapping of message data from among a set of candidate mappings. Each specific mapping can be represented using a flexible form such as a set of rules. Generally, the subject "encoding detector" method 10 utilizes standard character mapping schemes, such as ISO 8859-1 (Latin 1) or Unicode with a UTF-8 encoding. Typical character sets and their corresponding numeric codes or encoding schemes are shown below:

UTF-8 (a universal character set with a multi-byte encoding)
1 byte (OxOO–OxFF)
2–4 bytes (OxC2–OxF4, [0x80–OxBF], [0x80–OxBF], [Ox8O-OxBF])
ASCII (multiple character sets using a common, single byte encoding)
Non-printable (OxOO–Ox1F)
Printable (0x20–Ox7F)
Extended (0x80–OxFF)
Where extended-ASCII is regarded as a single-byte encoding, e.g. ISO-8859-1, ISO-8859-5, ISO-8859-7, etc.
Shift-JIS (a common Japanese character set with a multi-byte encoding)
1 byte (OxOO–Ox7F, OxA1–OxDF)
2 bytes (0x81–Ox9F, OxEO–OxFC, [Ox3F–OxFC])
GBK (a common Chinese character set with a multi-byte encoding)
1 byte (OxOO–Ox7F)
2 bytes (0x81–OxFE, [0x40–OxFF])

Each specific mapping can be represented using a flexible form such as a set of rules. This allows the easy extension to handle additional mappings.

The encoding detector method 10 works by examining data, inputted to or received 12 by the user's computer 14, which are known to be text strings having unknown mapping. The identification of such known text strings is facilitated in many protocols since certain fields are type coded as strings. Fields that are defined as strings in these protocols are used to pass text information between a computer and a printer, for example. Examples of protocols used in the operation of printing include LPR, IPP, HTTP, Kerberos, DHCP, LDAP, SMTP (with extensions), POP3, DNS, NetBIOS, Port 9100, SMB authentication, Samba, IPX/SPX, Pserver, AppleTalk, USB and the printer parallel port.

The encoding detection 10 proceeds by first, testing 16 the known text strings to determine whether the text contains only legal numeric codes. As can be seen from the character schemes above, some numeric code ranges are not allowed in a particular encoding scheme. For example, simple ASCII (the original 7-bit coding) does not allow codes above Ox7F. Printable ASCII only allows codes between 0x20 and Ox7F.

Next, the statistics of the numeric codes that appear in the text are analyzed for each legally coded candidate mapping to provide a ranking of the candidates 18. Simple statistics include characters in specific ranges that promote or eliminate the legal candidate mappings. More complex statistics on character occurrence for specific encodings in specific locales can be used to provide more subtle distinctions. The result of the statistical analysis is the ranking of the candidate mappings through the evaluation of specific code usage.

Finally, this ranking of candidate mappings is combined with an expected ranking of the set of mappings to provide a "best estimate" or most probable character mapping 20. Since mappings are not unique, using an expected set allows specification of locally preferred as well as commonly encountered mappings.

The above described encoding detector method has been implemented in a XOG/SEBU Endeavor controller by the simple, high level algorithm shown below:

```
for each string {
  Initialize statistics for the encoding state machines to
    record the analysis result of each byte of the string
  for each byte of the string {
    for each encoding state machine {
      Collect statistics
    }
  }
  Identify the candidate encodings based on the statistics
  for each encoding in the configurable encoding list {
    if encoding matches a candidate encoding {
      Encoding is detected!
    }
  }
  if encoding is not yet detected {
    for each encoding in a default encoding list {
```

```
        if encoding matches a candidate encoding {
            Encoding is detected!
        }
    }
}
```

The above implementation executes in two phases. In the scan phase, all the input strings for a body of text are tested for legality and corresponding statistics are accumulated. In the choose phase, the legal candidates and their statistics are combined with a preferred ranking to determine the best guess encoding.

The scan phase is implemented by a parallel state machine that examines 22 the input text byte by byte. Associated with each state transition are sets of action routines that determine 24 legality as well as count or flag specific conditions. The state machine is represented by a flexible table form that allows expansion of the rules. A text string that does not conform 26 to the rules is flagged 28 or otherwise identified. The computer then determines 30 whether every byte of each text string has been examined. If all of the text strings have not been examined 32, the next text string is examined 22. If all of the text strings have been examined 34, the computer then proceeds to evaluate 18 the text string statistics. The statistics are implemented as a set of coded routines triggered by flags in the state machine tables.

For simple encodings such as ASCII, the state machine performs several simple checks. If any byte is below (20)16, the string is flagged 28 as non-printable. If any byte is over 127, it is flagged 28 as extended. Hence, the encoding of a string could be determined as ASCII, printable ASCII, or extended-ASCII using only a two-state state machine.

For multiple-byte encodings such as Shift-JIS, the state machine is only slightly more complicated. For example, for a two-byte Shift-JIS character, if the first byte is (80)16, then the state machine enters state 2 and immediately flags 28 the string as invalid for Shift-JIS encoding. However, if the first byte is (81)16, then it enters state 1. While in this state, the next byte will be tested against the valid ranges for the second extension page. To continue the example, the byte may be less than (3F)16, in which case the character and the string are invalid, or it may be between (40)16 and (FC)16, in which case the character would be considered valid for Shift-JIS encoding and the state machine would return to state 0 to test the next byte.

It should be appreciated that a character string may well be valid in several encodings. For example, the bytes "e6 df" represent "aeβ" in ISO-8859-1 and " " in GBK. Once the statistics of a string have been recorded, they are validated against a set of hard-coded rules to identify 20 the best candidate encodings. For example, the fact that "e6 df" contains 2 extended-ASCII bytes implies that it cannot be an ASCII string. In this example, extended-ASCII, Shift-JIS and GBK are the three possible candidate encodings.

An ASCII encoding state machine is employed to determine if a stream of bytes is extended-ASCII. However, this state machine is unable to differentiate the specific single-byte encoding other than by the preference list mechanism described herein. Statistics representing the frequency of byte 36, bi-gram and tri-gram occurrence 38, 40 of the codes can be used to improve differentiation. This is based on the natural usage patterns for characters or short sub-strings in different languages that, in turn, map to common character encodings. This technique has been tested and found to be effective even on short strings such as user names.

The choose phase uses the prioritized list of encodings generated by the scan phase along with a prioritized list of preferred encodings to select 20 the best candidate encoding. The preferred encodings are implemented as two lists of encodings, each arranged in an order of preference. The first is a configurable list that is customized to the specific locale of usage. The second is a default list that is used if the first list is not configured.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of detecting the encoding utilized in an electronic document including a plurality of text strings, the text strings of the encoded document being associated with one of a plurality of legal numeric codes, the method comprising:
    testing the text strings to determine whether the electronic document contains only text strings having legal numeric codes;
    ranking a mapping of legally coded candidates by conducting a statistical analysis of the text strings;
    ranking the legally coded candidates; and
    determining a most probable character mapping by combining the ranking of legally coded candidates with an expected ranking of legally coded candidates.

2. The method of claim 1 wherein the text strings of at least one of the legal numeric codes are associated with a specific range of characters and conducting the statistical analysis includes comparing the text strings of the electronic document to the specific range of characters of the at least one legal numeric code.

3. The method of claim 1 wherein the text strings of at least one of the legal numeric codes include a specific encoding at a specific locale of the text string and conducting the statistical analysis includes determining whether the text strings of the electronic document include the specific encoding at the specific locale.

4. The method of claim 1 further comprising:
    periodically conducting a statistical analysis of the legal numeric codes to determine a ranking of most commonly used legal numeric codes; and
    utilizing the ranking of most commonly used legal numeric codes as the expected ranking of legally coded candidates.

5. The method of claim 4 wherein at least one of the legal numeric codes is a preferred code within a specific geographic region and the method further comprises weighting the expected ranking of legally coded candidates to favor the preferred code when the electronic document is encoded in the specific geographic region.

6. The method of claim 1 wherein each legal numeric code has a set of rules and testing the text strings comprises:
    a) examining each text string of the electronic document byte by byte;
    b) determining whether each text string conforms with the rules of one of the legal numeric codes;
    c) identifying each text string that does not conform with the rules of one of the legal numeric codes; and
    d) repeating a) through c) for each one of the legal numeric codes.

7. The method of claim 6 wherein testing the text strings further comprises utilizing a parallel state machine to test the text strings.

8. The method of claim 1 wherein at least one of the legal numeric codes may correlate with a language and the statistical analysis of the text strings provides a frequency of occurrence of the bytes of the text strings, wherein ranking the legally coded candidates includes:
- determining whether the frequency of occurrence of the bytes corresponds with usage patterns for characters corresponding with a language; and
- correlating the language to one of the legal numeric codes.

9. The method of claim 8 further comprising:
- determining whether a frequency of bi-gram occurrence of the bytes corresponds with usage patterns for characters corresponding with a language; and
- correlating the language to one of the legal numeric codes.

10. The method of claim 9 further comprising:
- determining whether a frequency of tri-gram occurrence of the bytes corresponds with usage patterns for characters corresponding with a language; and
- correlating the language to one of the legal numeric codes.

11. A method of detecting the encoding utilized in an electronic document including a plurality of text strings, the text strings of the encoded document being associated with one of a plurality of legal numeric codes, the method comprising:
- testing the text strings to determine whether the electronic document contains only text strings having legal numeric codes;
- ranking a mapping of legally coded candidates by conducting a statistical analysis of the text strings;
- ranking the legally coded candidates;
- periodically conducting a statistical analysis of the legal numeric codes to determine a ranking of most commonly used legal numeric codes;
- computing an expected ranking of legally coded candidates utilizing at least the ranking of most commonly used legal numeric codes; and
- determining a most probable character mapping by combining the ranking of legally coded candidates with the expected ranking of legally coded candidates.

12. The method of claim 11 wherein at least one of the legal numeric codes is a preferred code within a specific geographic region and the method further comprises weighting the expected ranking of legally coded candidates to favor the preferred code when the electronic document is encoded in the specific geographic region.

13. The method of claim 12 wherein each legal numeric code has a set of rules and testing the text strings comprises:
- a) examining each text string of the electronic document byte by byte;
- b) determining whether each text string conforms with the rules of one of the legal numeric codes;
- c) identifying each text string that does not conform with the rules of one of the legal numeric codes; and
- d) repeating a) through c) for each one of the legal numeric codes.

14. The method of claim 13 wherein at least one of the legal numeric codes may correlate with a language and the statistical analysis of the text strings provides a frequency of occurrence of the bytes of the text strings, wherein ranking the legally coded candidates includes:
- determining whether the frequency of occurrence of the bytes corresponds with usage patterns for characters corresponding with a language; and
- correlating the language to one of the legal numeric codes.

15. The method of claim 14 wherein the text strings of at least one of the legal numeric codes are associated with a specific range of characters and conducting the statistical analysis includes comparing the text strings of the electronic document to the specific range of characters of the at least one legal numeric code.

16. The method of claim 14 wherein the text strings of at least one of the legal numeric codes include a specific encoding at a specific locale of the text string and conducting the statistical analysis includes determining whether the text strings of the electronic document include the specific encoding at the specific locale.

17. A method of detecting the encoding utilized in an electronic document including a plurality of text strings, the text strings of the encoded document being associated with a one of a plurality of legal numeric codes, each legal numeric code has a set of rules, the method comprising:
- testing the text strings by
  - a) examining each text string of the electronic document byte by byte,
  - b) determining whether each text string conforms with the rules of one of the legal numeric codes,
  - c) identifying each text string that does not conform with the rules of one of the legal numeric codes, and
  - d) repeating a) through c) for each one of the legal numeric codes;
- ranking a mapping of legally coded candidates by conducting a statistical analysis of the text strings;
- ranking the legally coded candidates; and
- determining a most probable character mapping by combining the ranking of legally coded candidates with an expected ranking of legally coded candidates, the expected ranking of legally coded candidates including a ranking of most commonly used legal numeric codes.

* * * * *